3,071,632
RECOVERY OF COMMERCIAL GRADE NAPHTHALENE BY AZEOTROPIC DISTILLATION OF CRUDE NAPHTHALENES WITH A GLYCOL
Bruce K. Schmid, Pittsburgh, Pa., assignor to Gulf Research & Development Company, Pittsburgh, Pa., a corporation of Delaware
Filed Aug. 7, 1958, Ser. No. 753,722
10 Claims. (Cl. 260—674)

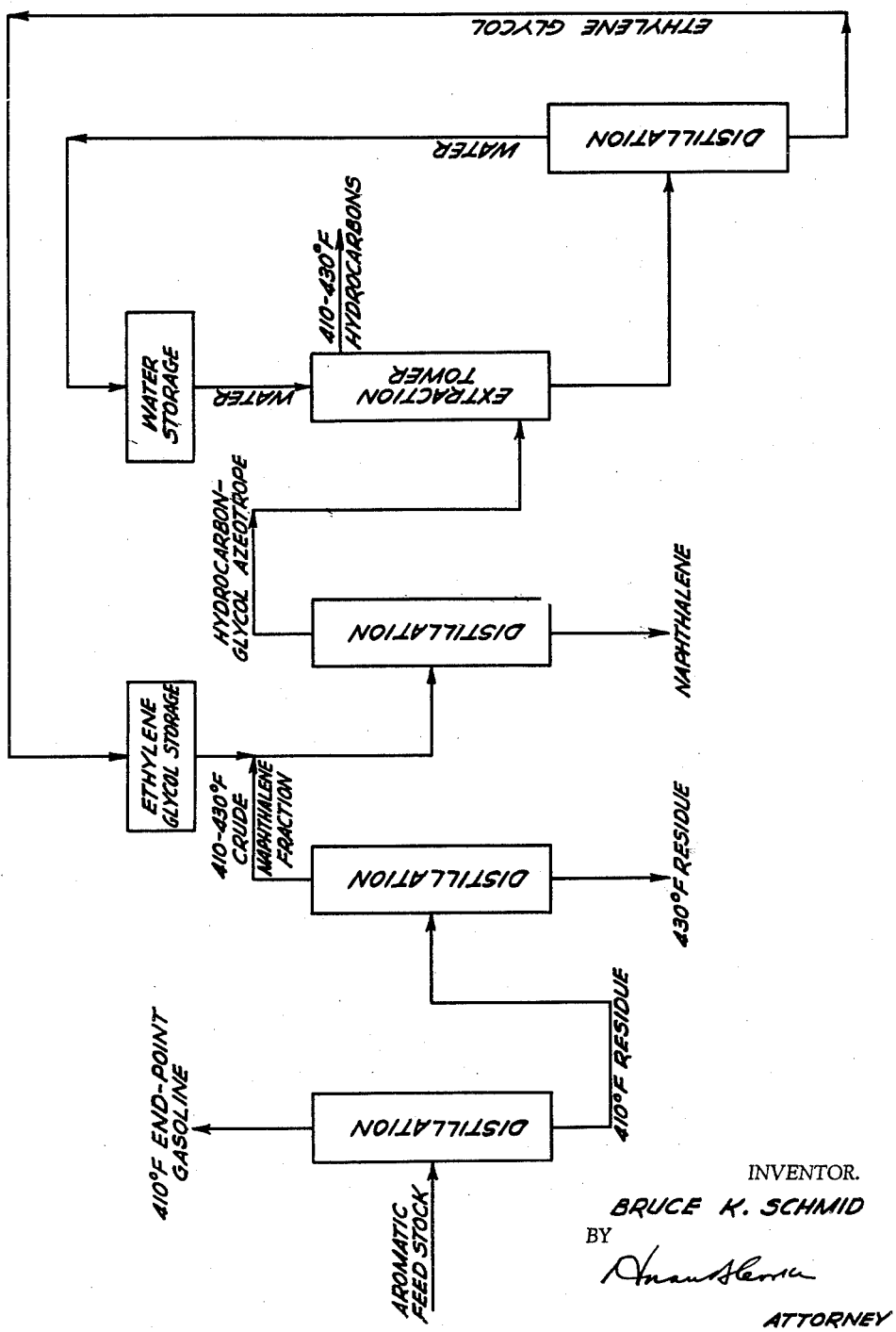

This invention relates to the separation of close boiling aromatic compounds by means of azeotropic distillation.

Many commercial mixtures contain close boiling aromatic type compounds which are extremely difficult or impossible to separate from each other by means of simple distillation. An example of such a mixture is one containing a polynuclear aromatic, such as naphthalene, in admixture with a close boiling partially saturated polynuclear aromatic. As used in this application, the term partially saturated polynuclear aromatic refers to a polynuclear fused ring aromatic compound wherein one of the fused aromatic rings is at least partially saturated with hydrogen and may or may not contain alkyl groups. Examples of such partially saturated polynuclear fused ring compounds are tetralin, 1-methyltetralin, 2-methyltetralin, etc. Although certain of such partially saturated polynuclear aromatics boil so close to certain unsaturated polynuclear compounds often existing in admixture with them that they cannot be separated by conventional distillation, it has now been found that these partially saturated aromatics may be readily separated from close boiling unsaturated aromatics by means of the addition of a glycol compound to the mixture followed by the overhead removal of the partially saturated polynuclear aromatics as an azeotrope with the glycol compound. Such an azeotrope has a boiling point differing sufficiently from the unsaturated aromatics to permit easy separations.

In accordance with this invention, compounds containing partially saturated polynuclear aromatic can be readily separated from a mixture containing them together with close boiling unsaturated polynuclear armoatics by means of the addition of a sufficient quantity of a glycol to the mixture to form an azeotrope between the glycol and the partially saturated polynuclear aromatics followed by the overhead removal of this azeotrope. Various glycols such as ethylene glycol, propylene glycol, etc. may be employed in accordance with this invention. However, the preferred glycol is ethylene glycol. Generally, between 0.5 to 50 or more moles of glycol should be employed for each mole of partially saturated polynuclear aromatic compound. Preferably, between 1 to 20 moles of glycol should be employed for each mole of partially saturated polynuclear aromatic compound. The unsaturated polynuclear aromatics remain behind in the concentrated residue. Water-washing of the residue will remove any glycol which has not gone overhead. If desired, the glycol can also be removed from the overhead product by solvent extraction with water.

Following this azeotropic distillation, the unsaturated polynuclear aromatics in the residue can be in a sufficiently pure state. If desired, these residue aromatics can be further purified by employing additional glycol and forming a second azeotrope between the unsaturated polynuclear aromatic compounds and the glycol, which azeotrope can be removed from the impure residue by distillation at a higher temperature than the boiling point of the azeotrope formed between the glycol and the partially saturated polynuclear aromatics. Between 1 to 5 moles of glycol per mole of unsaturated polynuclear aromatic should be employed for the formation of this second azeotrope. The unsaturated polynuclear aromatic can finally be recovered in a highly pure state by solvent extracting the glycol in admixture with it with water.

The method of this invention is particularly suited to the recovery of a commercial grade naphthalene from a mixture of naphthalene and close boiling partially saturated derivatives of naphthalene wherein one of the fused rings is saturated with hydrogen and contains alkyl groups. Examples of such mixtures containing substantial quantities of naphthalene are the products of catalytic reforming, heavy naphtha (400° to 450° F.) fractions from thermally and catalytically cracked gas oils and the aromatic and naphthenic concentrates obtained by the solvent refining of naphtha and light gas oil. These mixtures often contain 1-methyltetralin and 2-methyltetralin as well as other aromatic compounds as naphthalene impurities. The isomer of 1-methyltetralin wherein the methyl group is present on the alicyclic portion of the molecule (1-methyl-1,2,3,4 tetrahydronaphthalene) boils at 426.2° F. and the isomer of 2-methyltetralin wherein the methyl group is present on the alicyclic portion of the molecule (2-methyl-1,2,3,4 tetrahydronaphthalene) boils at 424.4° F. Naphthalene boils at 424.4° F. It is therefore seen that these isomers of 1-methyltetralin and 2-methyltetralin cannot be effectively separated from naphthalene by means of conventional distillation.

It has been found particularly advantageous that when the method of this invention is applied to the recovery of a commercially pure naphthalene from a refinery stream, many undesirable impurities other than the extremely close boiling partially saturated polynuclear aromatics such as 1-methyltetralin and 2-methyltetralin are also removed in the constant boiling mixture. For example, $C_{10}$, $C_{11}$ and $C_{12}$ aromatics, other than tetralins, as well as higher alkyl tetralins, are removed in a single constant boiling mixture together with glycol and methyltetralin in the treatment of a refinery stream according to this invention. The removal of these additional compounds in the azeotropic mixture obviates additional distillation steps to accomplish their removal in the production of a commercial grade naphthalene.

As indicated in the examples given below, constant boiling mixtures containing as many as eight separate components are removed from naphthalene containing streams. Since most azeotropes are binary or ternary and, less often, quaternary mixtures, the removal of a constant boiling mixture containing up to eight components is an unexpected advantage of this invention. Since azeotropes containing such a large number of components are unusual, it is probable that a close boiling mixture of azeotropes are distilling off together. Whether a close boiling mixture of azeotropes or a single azeotrope is being removed in accordance with the method of this invention, I use the word azeotrope to mean simply a constant boiling mixture.

In the preparation of a commercial grade of naphthalene, the petroleum fraction containing significant amounts of naphthalene should first be subjected to a simple distillation without the addition of an azeotrope former to obtain a crude narrow-boiling fraction containing a major proportion of naphthalene and a minor proportion of extremely close boiling impurities comprising partially saturated naphthalene compounds. Napthalene of commercial purity can then be isolated from this narrow-boiling crude fraction by azeotropic distillation using ethylene glycol. The partially saturated naphthalene impurities are removed overhead as an azeotrope with the ethylene glycol leaving a relatively pure naphthalene residue. Water-washing of the residue will remove any glycol which has not gone overhead. Ethylene glycol can also be removed from the overhead product by solvent extraction with water.

The purification of naphthalene by the formation of an azeotrope between the partially saturated impurities and the glycol rather than by the formation of an azeotrope with the naphthalene itself and the glycol has two advantages. First, the partially saturated impurities comprise a minor proportion of the mixture, thereby requiring less glycol for the azeotropic distillation than would be required if an azeotrope with the naphthalene itself were formed. Secondly, the azeotrope formed by glycol and the partially saturated impurities boils at a lower temperature than the naphthalene-glycol azeotrope, thereby allowing the conservation of heat.

Following the azeotropic removal of the partially saturated impurities, the naphthalene in the residue will be sufficiently pure for commercial requirements. However, if it is desired to further purify the naphthalene residue, this can be accomplished by the further addition of ethylene glycol and the overhead removal of an ethylene glycol-naphthalene azeotrope which has a boiling point higher than the previously removed azeotrope, followed by the extraction with water of the glycol present in the distillate of the naphthalene azeotrope.

This invention has particular application to the separation by azeotropic distillation of naphthalene in a state of commercial purity from refinery streams. Because of close boiling impurities present in refinery streams, naphthalene has not heretofore been removed in a state of commercial purity from these streams solely by distillative means but only by distillative means in conjunction with nondistillative means such as crystallization, solvent extraction, etc., or by non-distillative means alone. A particularly significant application of this invention lies in the removal of a commercially pure naphthalene from the effluent of a hydrogen reforming process. Hydrogen reforming includes the dehydrogenation and cyclization of a hydrocarbon stream, particularly hydrocarbons boiling in the gasoline range, at a temperature between 500° F. and 1100° F. and pressures between 50 and 1500 pounds per square inch gauge, with 1,000 to 10,000 standard cubic feet of hydrogen per barrel of charge in the presence of suitable reforming catalysts, for example, molybdena, chromia, tungsten, cobalt, nickel, platinum, etc. alone or as mixtures and preferably disposed on a suitable supporting material such as alumina. The effluent from such reforming processes contain varying amounts of naphthalene which has heretofore been separable in a state of commercial purity only with the aid of such methods as crystallization or solvent extraction. In accordance with this invention commercial grade naphthalene can now be recovered from a reformate by means of an azeotropic distillation process.

In accordance with this process and as illustrated in the FIGURE, a reformate containing naphthalene and other aromatics is charged to a distillation column and an overhead gasoline fraction boiling below 410° F. is distilled while a residue boiling above 410° F. is removed from the bottom of the column and fed to a second distillation column. In this second distillation column a crude naphthalene fraction boiling between 410° F. and 430° F. is removed overhead and is mixed with between 0.1 to 1 and 5 to 1 pounds of ethylene glycol per pound of crude naphthalene and fed to a third distillation column. Preferably, between 0.5:1 and 2:1 pounds of ethylene glycol should be employed per pound of crude naphthalene. In this third distillation column an azeotrope comprising impurities and ethylene glycol is distilled overhead while commercially pure naphthalene is removed as a bottoms product. The glycol-hydrocarbon impurity azeotrope can be further treated to remove the glycol for recycle to the process by being fed to the bottom of an extraction tower where it is washed counter-currently with water from a storage vessel. The 410° F. to 430° F. hydrocarbon impurities are removed from the top of the extraction tower while a mixture of water and glycol is removed from the bottom of the extraction tower and fed to a distillation column where water is boiled off and returned to the water storage vessel while ethylene glycol is removed as a bottoms product and recycled to ethylene glycol storage.

We have found that it is especially important to form the glycol azeotrope of the naphthalene impurities from a crude naphthalene fraction boiling between 410° F. and 430° F. when preparing commercial grade naphthalene from a reformate stream. Substantially all the close boiling impurities present in a reformate fraction boiling between 410° F. and 430° F. tend to azeotrope readily with glycol leaving naphthalene in a commercially pure state as the residue. The close boiling materials present in a 410-430° F. fraction form an azeotrope with glycol which boils at a temperature sufficiently removed from the boiling point of naphthalene itself so that a minimum of naphthalene is removed along with the azeotrope. However, if certain materials are present which boil substantially above 430° F. there is a resulting loss in yield of naphthalene since many of these higher boiling materials have a tendency to form independent azeotropes with glycol which boil so close to the boiling point of naphthalene or the naphthalene-glycol azeotrope that a high proportion of naphthalene is removed along with such azeotropes. Methylnaphthalene is an example of a higher boiling material whose azeotrope with glycol boils sufficiently close to the boiling point of the naphthalene azeotrope that it would be extremely difficult to recover any substantial yield of purified naphthalene according to this invention without first removing substantially all the methylnaphthalene present. Accordingly, the crude naphthalene cut must be free of methylnaphthalene and since methylnaphthalene boils above 430° F., it is substantially absent when employing a fraction boiling between 410° F. and 430° F. A further advantage of preparing a crude naphthalene fraction prior to the azeotropic distillation as described is that the presence of diluents tend to make the formation of the desired azeotrope between the close boiling impurities of naphthalene and glycol more difficult. In addition the presence of such diluents whether they are higher or lower boiling result in greatly increased glycol requirements.

The method of this invention produces a naphthalene of commercial purity having at least a 75° C. melting point from a typical product of a severe hydroreforming process. In a test made in accordance with this invention, the 400° F. to 475° F. fractions from a number of reforming runs were composited. This composite contained 37.4 percent by weight naphthalene, 31.5 percent methylnaphthalene and 31.1 percent other aromatic compounds. This composite was precision distilled at 420° F. at which temperature a sharp naphthalene plateau was observed. The crude naphthalene product recovered from this distillation had a melting point of only 64° C. compared to 80° C. for pure naphthalene. This naphthalene was not sufficiently pure to meet the minimum commercial melting point specification which is 74° C.

The analysis of this crude naphthalene cut is shown in Table 1. It is observed that the major impurities are methyltetralin and $C_{11}$–$C_{12}$ mononuclear aromatics. Two isomers of methyltetralin in addition to some $C_{11}$–$C_{12}$ mononuclear aromatics have boiling points close to that of naphthalene and cannot ordinarily be removed by distillation. The $C_{10}$, $C_{11}$ and $C_{12}$ mononuclear aromatics are so designated in Table 1 since only one nucleus is an aromatic nucleus. However, included among these compounds are some partially saturated polynuclear aromatics as defined above, other than tetralin and methyltetralin.

The 420° F. fraction of crude naphthalene was admixed with ethylene glycol in approximately a 1:1 ratio by weight of ethylene glycol to crude naphthalene and distilled to give three cuts designated in Table 1 as cut 1, cut 2, and cut 3.

TABLE 1

*Purification of Crude Naphthalene by Azeotropic Distillation With Ethylene Glycol*

| | Charge, Crude [1] Naphthalene | Products | | |
|---|---|---|---|---|
| | | Cut 1 Ethylene Glycol Azeotrope | Cut 2 Transition Cut | Cut 3 Purified Product |
| Composition, Mole Percent (Ethylene Glycol-Free Basis): | | | | |
| Naphthalene | 82.9 | 40.2 | 77.0 | 92.7 |
| Methylnaphthalene | 0.1 | 4.5 | 0.2 | 0.0 |
| Tetralin | 1.9 | 12.7 | 0.6 | 0.1 |
| Methyltetralin | 3.1 | 8.1 | 3.1 | 1.3 |
| Higher Alkyl Tetralins | 0.3 | 0.7 | 0.3 | 0.1 |
| $C_{10}$ Mononuclear Aromatics | 0.4 | 2.2 | 0.5 | 0.1 |
| $C_{11}$ Mononuclear Aromatics | 3.7 | 18.6 | 6.0 | 0.8 |
| $C_{12}$ Mononuclear Aromatics | 7.6 | 13.0 | 12.3 | 4.9 |
| Total | 100.0 | 100.0 | 100.0 | 100.0 |
| Yield, Percent by Weight of Charge | 100.0 | 16.3 | 11.7 | 72.0 |
| Naphthalene Recovery, Percent by Weight of Original Naphthalene | 100.0 | 7.6 | 11.9 | 80.5 |
| Temperature at end of cut, °F | | 354 | 419 | 420 |
| Melting Point, 64° C | | | | 75 |

[1] Prepared by distillation from a composite of 400°–475° F. fractions from severe hydroreforming of heavy FCC naphtha. This composite contained 37.4 percent by weight naphthalene.

As shown in Table 1, the first overhead fraction was taken off at a temperature of 354° F. This comprised the ethylene glycol azeotrope and, on a glycol free basis, contained 40.2 percent naphthalene together with a major proportion of impurities. Following the removal of this ethylene glycol-impurity azeotrope, the distillation temperature quickly rose to 419° F. during which time a transition cut containing 77.0 percent naphthalene was removed. This transition cut is essentially an impure mixture of cut 1 and cut 3. Cut 3 represents the purified product which could be removed as a residue, but in this case was distilled at 420° F. to remove the naphthalene product as an overhead stream containing 92.7 percent naphthalene having a melting point of 75° C. which satisfies minimum commercial naphthalene specifications of 74° C.

In a second test illustrating the separation of a commercial grade of naphthalene from the effluent of a reforming process, a 400° F. to 475° F. fraction of the liquid product from severe hydroreforming of heavy fluid catalytically cracked naphtha was precision distilled to separate a crude naphthalene cut. This cut was removed overhead at a constant temperature of 420° F. and contained a major proportion of naphthalene and a minor proportion of impurities, largely tetralin, 1-methyltetralin and 2-methyltetralin. 139.4 grams of this crude naphthalene which had a melting point of 63° C. were then distilled in the presence of ethylene glycol and an azeotrope was formed and removed at 351° F. Ethylene glycol was added in approximately a 1:1 ratio by weight to crude naphthalene. The azeotrope formed including the transition cut contained 50.9 grams of hydrocarbon removed from the crude mixture, or 36.5 percent of the mixture. Following the overhead removal of the azeotrope, the naphthalene (88.5 grams) was then taken overhead at 420° F. and was found to have a melting point of 75° C. The 351° F. ethylene glycol azeotrope contained approximately 73 percent ethylene glycol. Following is an analysis of this azeotrope on a glycol-free basis:

| Compound: | Mole Percent |
|---|---|
| Naphthalene | 13.7 |
| Tetralin | 26.9 |
| 1-methyltetralin / 2-methyltetralin | 37.5 |
| Ethyltetralin | 0.4 |
| $C_{10}$ mononuclear aromatics | 2.6 |
| $C_{11}$ mononuclear aromatics | 18.0 |
| $C_{12}$ mononuclear aromatics | 0.9 |
| | 100.0 |

The concentration of naphthalene shows little variation in reformate prepared at low severities but increases sharply in the range of severities which produce 101 to 105 octane number gasoline and tends to level off thereafter at a concentration somewhat above 50 percent by weight. The following table shows the composition of the 400–475° F. fraction of the liquid product of severe hydroreforming of a 374–457° F. fluid catalyitcally cracked naphtha.

| Research Clear Octane Number of I.B.P.—400° F. Gasoline | Naphthalene | 1-methyl naphthalene | 2-methyl naphthalene | Other aromatic compounds (including methyltetralins and other close-boiling naphthalene impurities) |
|---|---|---|---|---|
| 97 | 13 | 11 | 22 | 54 |
| 101 | 16 | 10 | 21 | 53 |
| 103 | 30 | 13 | 20 | 37 |
| 104 | 36 | 11 | 24 | 29 |
| 110 | 51 | 10 | 20 | 19 |

The above table shows that at hydroreforming severities which produce an increase in research clear octane number from 101 to 105, measured in the fraction of the product boiling up to 400° F., the sharpest increase in the quantity of naphthalene and the sharpest decrease in the amount of the aromatic fraction which contains methyltetralins and other impurities boiling close to naphthalene occurs. The above table shows that reaction severities producing a research clear octane number of at least 105 in the initial boiling point to 400° F. fraction of the product should be employed when it is desired to recover commercially pure naphthalene from the reformate of a fluid catalytically cracked naphtha. Since even at high severities aromatic impurities boiling close to naphthalene are not completely eliminated, it appears that conventional distillation could not be used as a separation method at any practical reaction severity.

The above examples illustrate the recovery of a commercial grade naphthalene from a mixture containing it together with difficultly separable compounds such as 1-methyltetralin and 2-methyltetralin. The closeness of the boiling points of naphthalene and the previously mentioned isomers of 1-methyltetralin and 2-methyltetralin emphasizes the difficulty of separating naphthalene from these compounds by conventional distillation means.

The azeotropic distillation can be carried out in a batch vessel but is preferably performed in a continuous multiplate distillation column. For example, the thylene glycol azeotropic distillation of a reformate stream to produce a commercial grade naphthalene can be carried out in a column containing 20 theoretical plates employing a 10:1 reflux ratio and having a pot temperature of 375° F.

Various changes and modifications may be made without departing from the spirit of this invention and the scope thereof as defined in the following claims.

I claim:
1. A process for the treatment of a refinery stream containing naphthalene together with impurities of the group consisting of 1,2,3,4-tetrahydronaphthalene, 1-methyl-1,2,3,4-tetrahydronaphthalene, 2-methyl-1,2,3,4-tetrahydronaphthalene, a $C_{10}$ mononuclear aromatic, a $C_{11}$ mononuclear aromatic, and a $C_{12}$ mononuclear aromatic for the separation of commercially pure naphthalene having a melting point of at least 74° C. comprising separating a crude naphthalene fraction boiling between 410° and 430° F., said fraction containing the impurities of said group, adding between 0.1 to 1 and 5 to 1 pounds of a glycol per pound of crude naphthalene fraction to form a crude naphthalene-glycol mixture, distilling said mixture to remove overhead and azeotrope comprising glycol and impurities leaving a commercially pure naphthalene residue.

2. A process for the treatment of the effluent of a hydrogen reforming process containing naphthalene together with impurities of the group consisting of 1,2,3,4-tetrahydronaphthalene, 1 - methyl-1,2,3,4-tetrahydronaphthalene, 2-methyl-1,2,3,4-tetrahydronaphthalene, a $C_{10}$ mononuclear aromatic, a $C_{11}$ mononuclear aromatic, and a $C_{12}$ mononuclear aromatic for the separation of commercially pure naphthalene having a melting point above 74° C. comprising the separation of a crude naphthalene fraction boiling between 410° and 430° F. from said reformate stream, said fraction containing the impurities of said group, adding between 0.1 to 1 and 5 to 1 pounds of ethylene glycol per pound of crude naphthalene to form a crude naphthalene-glycol mixture, distilling said mixture to remove overhead an azeotrope comprising ethylene glycol and impurities leaving commercially pure naphthalene as a residue, passing said azeotrope to the bottom of an extraction tower and washing said azeotrope countercurrently with water to remove an overhead stream comprising the hydrocarbon impurities present in the crude naphthalene and removing a bottoms stream comprising a water and ethylene glycol mixture, passing said water and ethylene glycol mixture to a distillation column and removing water from the top of said distillation column for recycle and removing ethylene glycol from the bottom of said distillation column for recycle.

3. A process for the recovery of commercial grade naphthalene from a reformate stream which was treated under dehydrogenation-cyclization reforming conditions of 500° F. to 1,000° F., 50 to 1500 pounds per square inch gauge, 1,000 to 10,000 standard cubic feet of hydrogen per barrel in the presence of a reforming catalyst and contains naphthalene in admixture with impurities of the group consisting of 1,2,3,4-tetrahydronaphthalene, 1-methyl-1,2,3,4-tetrrhydronaphthalene, 2-methyl-1,2,3,4-tetrahydronaphthalene, a $C_{10}$ mononuclear aromatic, a $C_{11}$ mononuclear aromatic, and a $C_{12}$ mononuclear aromatic, comprising the separation of a fraction boiling between 410° and 430° F. from said reformate, said fraction being crude naphthalene containing naphthalene and the impurities of said group, adding 0.1 to 1 to 5 to 1 pounds of a compound selected from the group consisting of ethylene glycol and propylene glycol per pound of said crude naphthalene to form a crude naphthalene-glycol mixture, passing said mixture to a distillation column and removing overhead an azeotrope comprising the glycol and naphthalene impurities leaving commercially pure naphthalene as a residue, and recovering the glycol from said overhead azeotrope.

4. A process for the separation of naphthalene from the reformate of a fluid catalytically cracked naphtha comprising treating said naphtha under hydro-reforming conditions which produce a reformate whose fraction boiling up to 400° F. has a research clear octane number of at least 105, separating a crude naphthalene fraction boiling between 410 and 430° F. from said reformate, said crude naphthalene fraction containing naphthalene together with impurities of the group consisting of 1,2,3,4-tetrahydronaphthalene, 1-methyl-1,2,3,4-tetrahydronaphthalene, 2-methyl-1,2,3,4-tetrahydronaphthalene, a $C_{10}$ mononuclear aromatic, a $C_{11}$ mononuclear aromatic, and a $C_{12}$ mononuclear aromatic, adding between 0.1 to 1 and 5 to 1 pounds of ethylene glycol per pound of crude naphthalene to form a crude naphthalene-glycol mixture and distilling said mixture to remove overhead an azeotrope comprising ethylene glycol and impurities of said group leaving commercially pure naphthalene as a residue.

5. A process for the preparation of a commercial grade naphthalene from a mixture containing naphthalene together with impurities of the group consisting of 1,2,3,4-tetrahydronaphthalene, 1 - methyl - 1,2,3,4 - tetrahydronaphthalene, 2-methyl-1,2,3,4-tetrahydronaphthalene, a $C_{10}$ mononuclear aromatic, a $C_{11}$ mononuclear aromatic, and a $C_{12}$ mononuclear aromatic comprising the addition of a glycol to the mixture in a 0.1 to 1 to 5 to 1 ratio by weight of glycol to the crude naphthalene mixture and distilling overhead an azeotrope comprising glycol and said impurities.

6. A process for the preparation of a commercial grade naphthalene from a mixture containing naphthalene together with impurities of the group consisting of 1,2,3,4-tetrahydronaphthalene, 1-methyl-1,2,3,4-tetrahydronaphthalene, 2-methyl-1,2,3,4-tetrahydronaphthalene, a $C_{10}$ mononuclear aromatic, a $C_{11}$ mononuclear aromatic, and a $C_{12}$ mononuclear aromatic comprising the addition of a compound selected from the group consisting of ethylene glycol and propylene glycol to the mixture in a 0.1 to 1 to 5 to 1 ratio by weight of glycol to the crude naphthalene mixture and distilling overhead an azeotrope comprising glycol and said impurities.

7. A process for the preparation of a commercial grade naphthalene from a mixture containing naphthalene together with impurities of the group consisting of 1,2,3,4-tetrahydronaphthalene, 1-methyl-1,2,3,4-tetrahydronaphthalene, 2-methyl-1,2,3,4-tetrahydronaphthalene, a $C_{10}$ mononuclear aromatic, a $C_{11}$ mononuclear aromatic, and a $C_{12}$ mononuclear aromatic comprising the addition of ethylene glycol to this mixture in a 0.1 to 1 to 5 to 1 ratio by weight of ethylene glycol to the crude naphthalene mixture and distilling overhead an azeotrope comprising ethylene glycol and said impurities.

8. A process for the preparation of a commercial grade naphthalene from a mixture containing naphthalene together with impurities comprising 1,2,3,4-tetrahydronaphthalene, 1-methyl-1,2,3,4-tetrahydronaphthalene, 2-methyl-1,2,3,4-tetrahydronaphthalene, a $C_{10}$ mononuclear aromatic, a $C_{11}$ mononuclear aromatic, and a $C_{12}$ mononuclear aromatic comprising the addition of ethylene glycol to this mixture in a 0.1 to 1 to 5 to 1 ratio by weight of ethylene glycol to the crude naphthalene mixture and distilling overhead an azeotrope comprising ethylene glycol and said impurities.

9. A process for the treatment of a refinery stream containing naphthalene together with impurities of the group consisting of 1,2,3,4-tetrahydronaphthalene, 1-methyl-1,2,3,4-tetrahydronaphthalene, 2-methyl-1,2,3,4-tetrahydronaphthalene, a $C_{10}$ mononuclear aromatic, a $C_{11}$ mononuclear aromatic, and a $C_{12}$ mononuclear aromatic for the separation of commercially pure naphthalene having a melting point of at least 74° C. comprising separating a crude naphthalene fraction containing the impurities of said group from said refinery stream, adding between 0.1 to 1 and 5 to 1 pounds of a compound selected from the group consisting of ethylene glycol and propylene glycol per pound of crude naphthalene fraction to form a crude naphthalene-glycol mixture, distilling said mixture to remove an overhead azeotrope comprising glycol and impurities leaving a commercially pure naphthalene residue.

10. A process for the treatment of a refinery stream containing naphthalene together with impurities of the group consisting of 1,2,3,4-tetrahydronaphthalene, 1- methyl-1,2,3,4-tetrahydronaphthalene, 2-methyl-1,2,3,4-tetrahydronaphthalene, a $C_{10}$ mononuclear aromatic, a $C_{11}$ mononuclear aromatic, and a $C_{12}$ mononuclear aromatic for the separation of commercially pure naphthalene having a melting point of at least 74° C. comprising separating a crude naphthalene fraction containing the impurities of said group from said refinery stream, adding between 0.1 to 1 and 5 to 1 pounds of ethylene glycol per pound of crude naphthalene fraction to form a crude naphthalene-glycol mixture, distilling said mixture to remove an overhead azeotrope comprising glycol and impurities leaving a commercially pure naphthalene residue.

References Cited in the file of this patent

UNITED STATES PATENTS

| | | |
|---|---|---|
| 2,456,561 | Lake | Dec. 14, 1948 |
| 2,475,977 | Meier | July 12, 1949 |

FOREIGN PATENTS

| | | |
|---|---|---|
| 668,853 | Great Britain | Mar. 26, 1952 |
| 1,037,756 | France | Sept. 22, 1953 |

OTHER REFERENCES

Mair et al.: "Journal of Research of the National Bureau of Standards" (1941), pages 39–62.

UNITED STATES PATENT OFFICE
CERTIFICATE OF CORRECTION

Patent No. 3,071,632 January 1, 1963

Bruce K. Schmid

It is hereby certified that error appears in the above numbered patent requiring correction and that the said Letters Patent should read as corrected below.

Column 6, line 67, for "thylene" read -- ethylene --; column 7, line 15, for "and" read -- an --.

Signed and sealed this 18th day of June 1963.

(SEAL)
Attest:

ERNEST W. SWIDER
Attesting Officer

DAVID L. LADD
Commissioner of Patents